US012759565B2

(12) United States Patent
Agyeman et al.

(10) Patent No.: US 12,759,565 B2
(45) Date of Patent: Oct. 13, 2026

(54) SENSOR AGGREGATION IN AUTONOMOUS VEHICLES

(71) Applicant: EMBARK TRUCKS INC., San Francisco, CA (US)

(72) Inventors: Kwabena Agyeman, San Francisco, CA (US); Igor Prilepov, San Francisco, CA (US)

(73) Assignee: Embark Trucks Inc., San Francisco, CA (US)

( * ) Notice: Subject to any disclaimer, the term of this patent is extended or adjusted under 35 U.S.C. 154(b) by 366 days.

(21) Appl. No.: 18/124,328

(22) Filed: Mar. 21, 2023

(65) Prior Publication Data

US 2024/0317243 A1 Sep. 26, 2024

(51) Int. Cl.

| | |
|---|---|
| ***B60W 50/00*** | (2006.01) |
| ***B60R 16/023*** | (2006.01) |
| ***B60W 60/00*** | (2020.01) |
| ***H04L 67/12*** | (2022.01) |

(52) U.S. Cl.

CPC ..... *B60W 50/0098* (2013.01); *B60R 16/0231* (2013.01); *B60W 60/0015* (2020.02); *H04L 67/12* (2013.01); *B60W 2050/0083* (2013.01)

(58) Field of Classification Search

None

See application file for complete search history.

(56) References Cited

U.S. PATENT DOCUMENTS

| | | | | |
|---|---|---|---|---|
| 12,207,371 | B2 * | 1/2025 | Bakk | H05B 47/12 |
| 2013/0212214 | A1 | 8/2013 | Lawson et al. | |
| 2016/0112216 | A1 * | 4/2016 | Sargent | G07C 5/008 370/328 |
| 2019/0250610 | A1 * | 8/2019 | Luo | B60W 50/0098 |
| 2020/0326958 | A1 | 10/2020 | Blumenthal | |
| 2022/0006669 | A1 | 1/2022 | Wang et al. | |
| 2023/0322241 | A1 * | 10/2023 | Hayes | B60W 50/0205 |
| 2024/0270184 | A1 * | 8/2024 | Schade | B60R 16/0231 |

FOREIGN PATENT DOCUMENTS

| | | | |
|---|---|---|---|
| KR | 10-2022-0152268 | A | 11/2022 |
| WO | 2022/156288 | A1 | 7/2022 |

OTHER PUBLICATIONS

Extended European Search Report for European Patent Application No. 24164971.4, dated Jun. 18, 2024 (14 pages).
Japanese Office Action for Japanese Patent Application No. 2024-042976, dated Feb. 18, 2025 (12 pages).
Korean Notice of Preliminary Rejection for Korean Patent Application No. 10-2024-0036919, dated Apr. 1, 2025 (17 pages).

* cited by examiner

*Primary Examiner* — Arslan Azhar

(74) *Attorney, Agent, or Firm* — Sheppard Mullin Richter & Hampton LLP

(57) ABSTRACT

A system and methods for a computer system to operate an autonomous vehicle via a safety gateway which aggregates the input data streams from the variety of sensors over different communication protocols and provides an abstracted mechanism to issue torque, brake, steering and any other vehicle specific commands.

20 Claims, 10 Drawing Sheets

SENSOR AGGREGATION IN AUTONOMOUS VEHICLES

BACKGROUND

Autonomous vehicles (e.g., self-driving trucks) include sensors, devices, and systems that may function together to generate sensor data indicative of various parameter values related to the position, speed, operating characteristics of the vehicle, indications of the specific surroundings of the self-driving vehicle, and a state of the vehicle. These sensors and other devices can include cameras, vehicle diagnostic devices, lidars, temperature and pressure sensors, etc. Many of these sensors or devices use different data formats and transmission protocols. An autonomous vehicle may have one or more central computers that collect, store and process this data.

Unfortunately, many of these sensors or devices communicate the data over different protocols, including controller area network ("CAN") bus, different Ethernet protocols (including different connector types, such as RJ-45, fiber optic, coaxial, etc.), serial communication (such as RS-232), or the like. This can result in a difficult to manage assortment of cables, wires, connectors, and other adapters. These connections are susceptible to vibration and failure in autonomous driving environments. Further, they are difficult to manage and maintain. This type of connection approach also makes it difficult to implement redundant computing systems, as the wiring and connection problems are exacerbated with multiple computing systems.

As such, there exists a need for systems and methods to aggregate sensors and other devices in autonomous vehicles.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
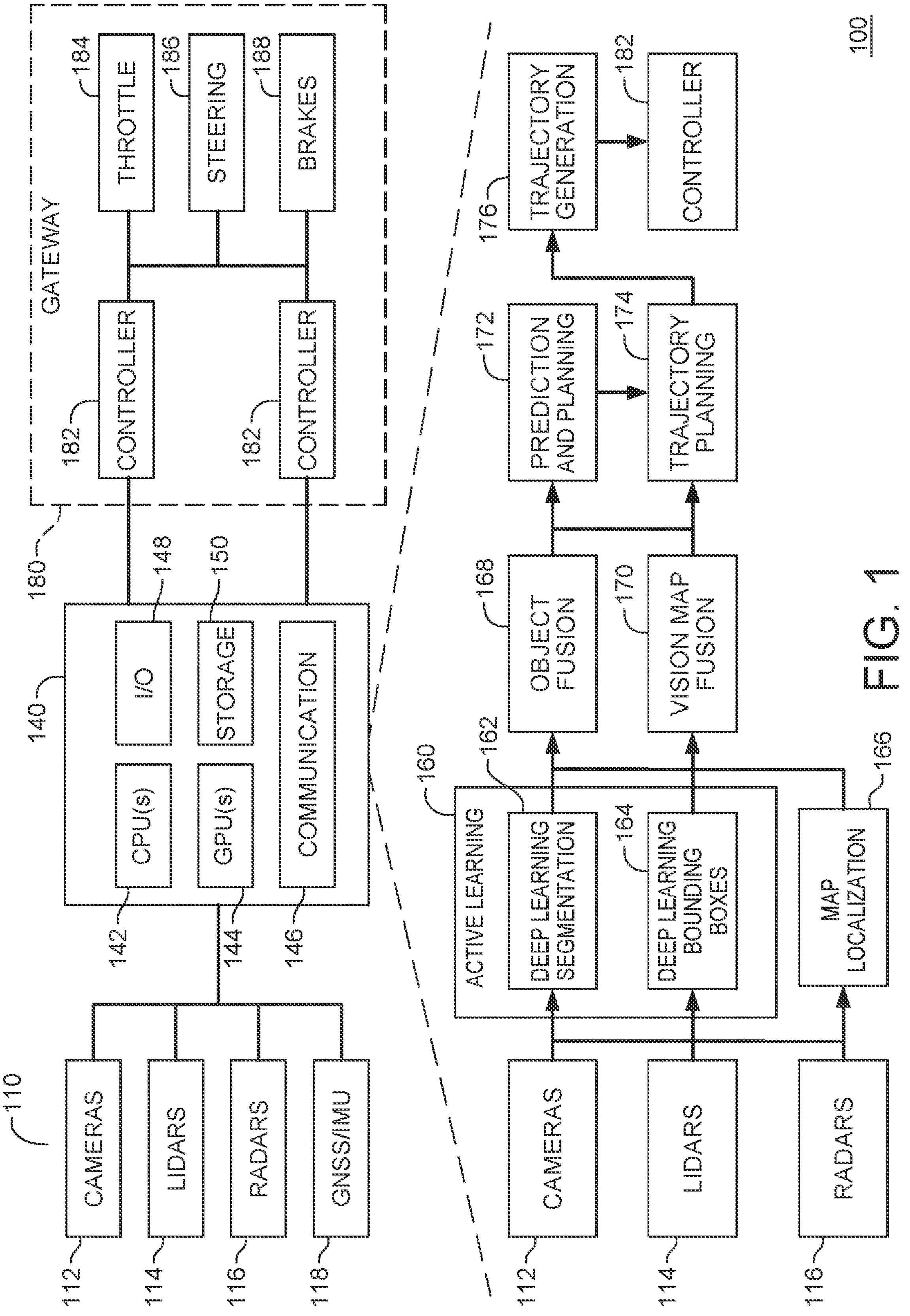
FIG. 1 is an illustrative block diagram of a control system that may be deployed in an autonomous vehicle, pursuant to some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the one or more principles defined herein may be applied to other embodiments and applications without departing from the spirit and scope of the present disclosure. Moreover, in the following description, numerous details are set forth for the purpose of explanation. However, one of ordinary skill in the art should understand that embodiments may be practiced without the use of these specific details. In other instances, well-known structures, methods, procedures, components, and circuits are not shown or described so as not to obscure the description with unnecessary detail. Thus, the present disclosure is not intended to be limited to the embodiments shown but is to be accorded the widest scope consistent with the principles and features disclosed herein.

For convenience and ease of exposition, a number of terms will be used herein. For example, the term "semi-truck" will be used to refer to a vehicle in which systems of the example embodiments may be used. The terms "semi-truck", "truck", "tractor", "vehicle" and "semi" may be used interchangeably herein. However, it is understood that the scope of the invention is not limited to use within semi-trucks.

Figure 7A:
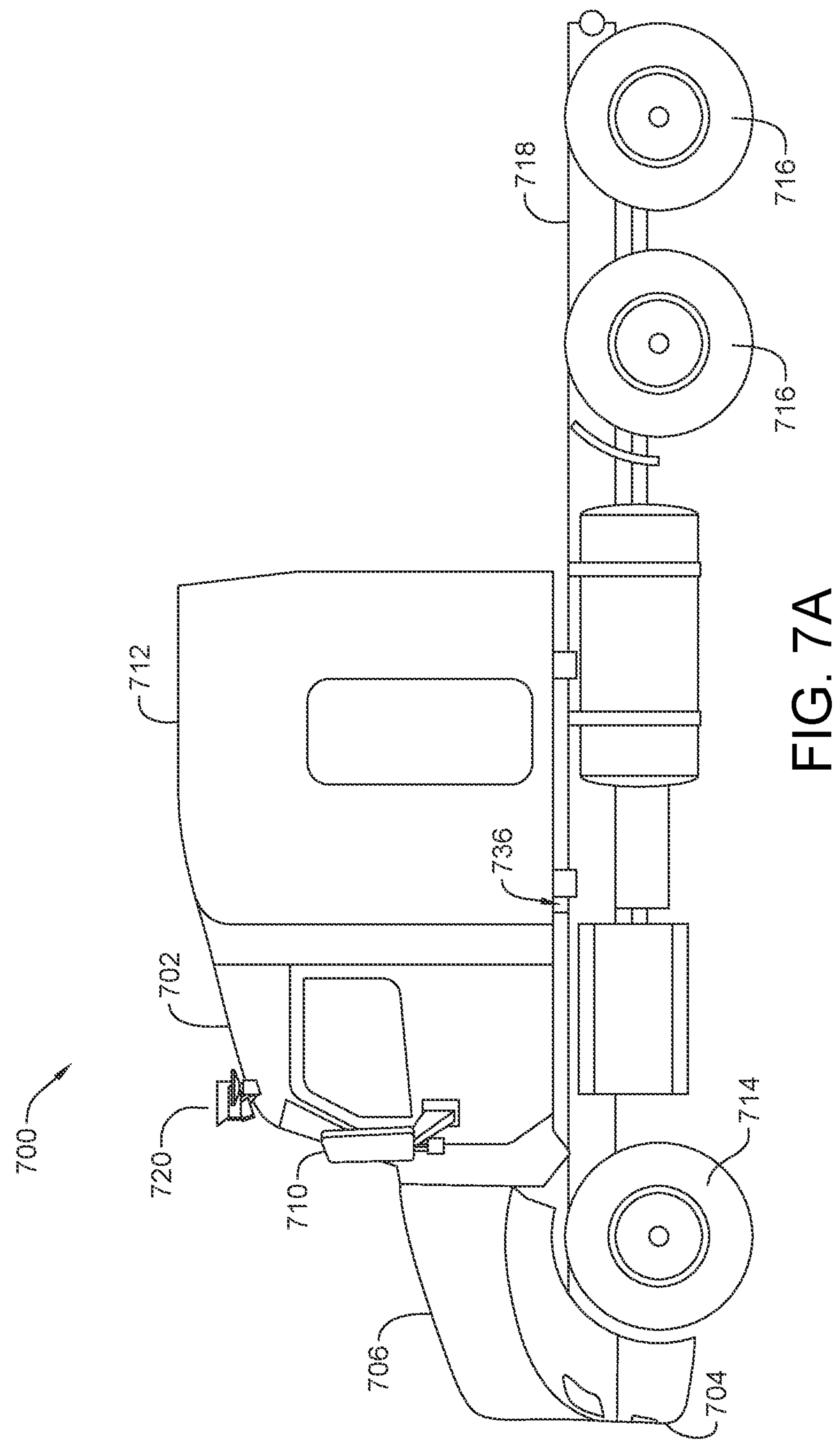
FIGS. 7A-C are illustrative views of an autonomous vehicle pursuant to some embodiments.
Figure 7B:
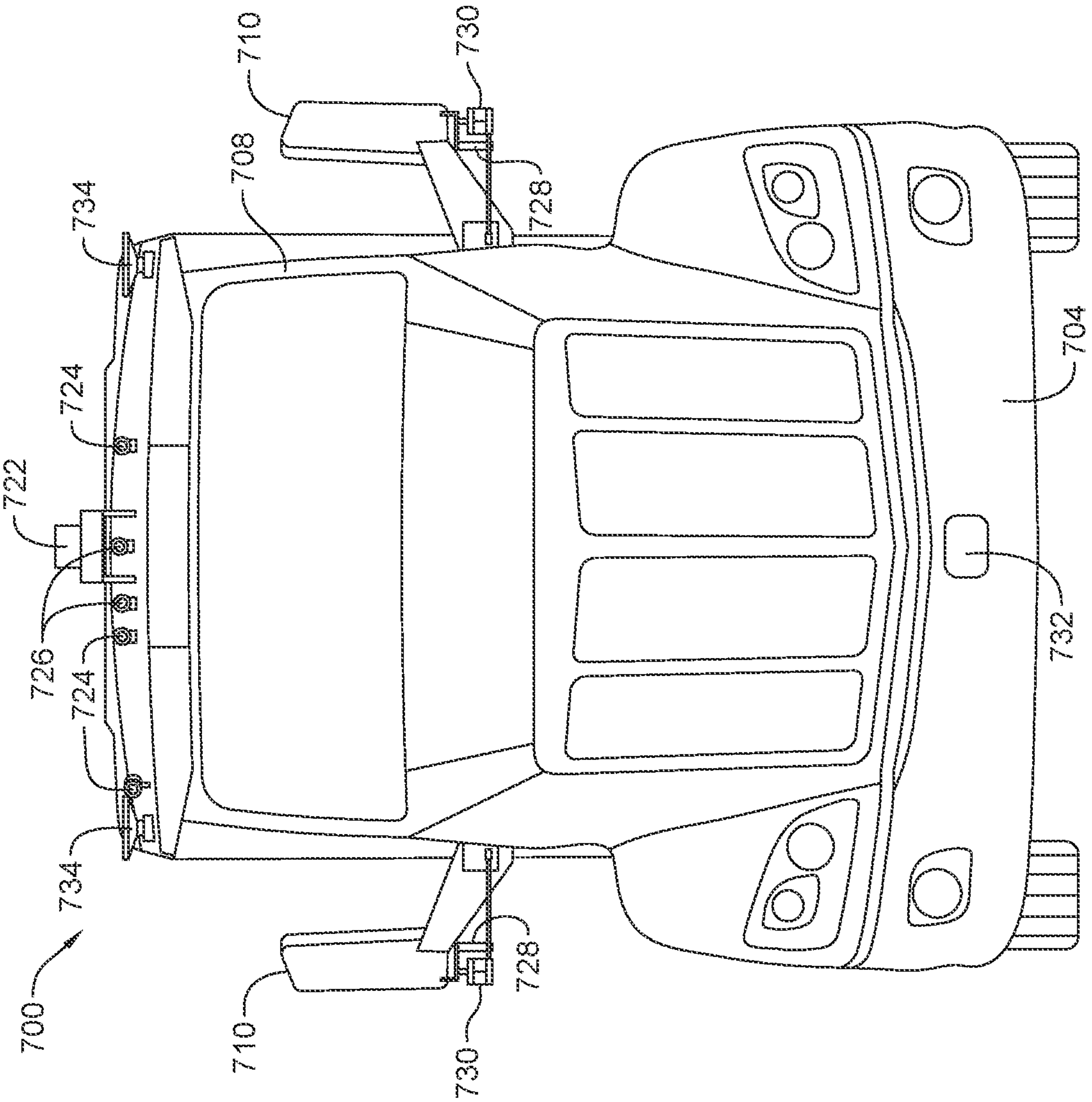
Figure 7C:
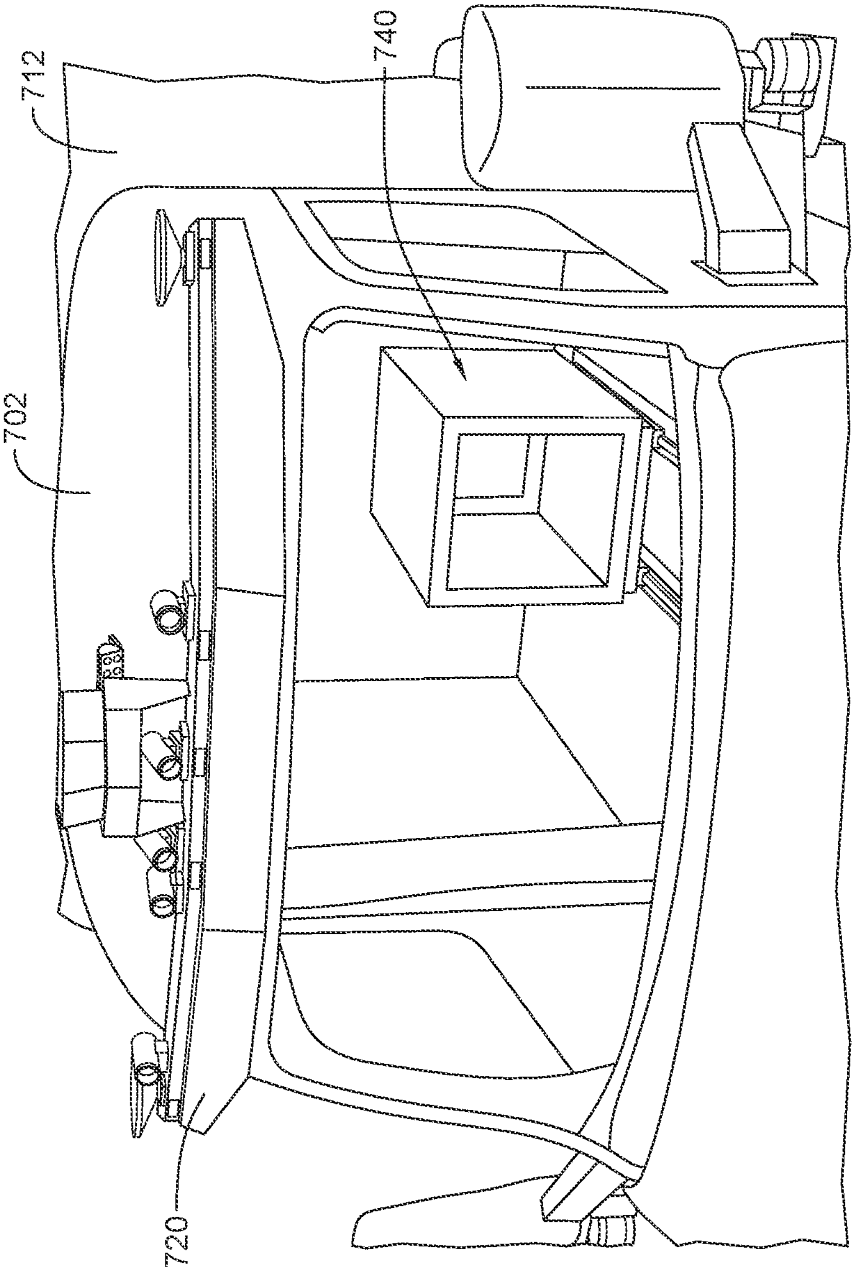

Prior to a description of the sensor aggregations systems and methods of the present invention, reference is first made to FIG. 1 which illustrates aspects of a control system 100 that may be deployed in an autonomous or semi-autonomous vehicle such as, for example though not limited to, a semi-truck (such as the semi-truck 700 depicted in FIGS. 7A-7C). The control system 100 will be described to introduce and illustrate the types of sensors and other devices that may be in communication with a computer system 140 on an autonomous or semi-autonomous vehicle (hereinafter, such vehicles will generally be referred to "autonomous" vehicles for convenience).

A control system 100 may include sensors 110 that collect data and information provided to a computer system 140 to perform operations including, for example, control operations that control components of the vehicle via a gateway 180. Pursuant to some embodiments, gateway 180 is configured to allow the computer system 140 to control vehicle components from different manufacturers. Computer system 140 may be configured with one or more central processing units (CPUs) 142 to perform processing, including processing to implement features of embodiments of the present invention as described elsewhere herein, as well as to receive sensor data from sensors 110 for use in generating control signals to control one or more actuators or other controllers associated with systems of the vehicle in which control system 100 is deployed (e.g., actuators or controllers allowing control of engine 184, steering systems 186, brakes 188 and/or other devices and systems). In general, control system 100 may be configured to operate the vehicle (e.g., semi-truck 700) in an autonomous (or semi-autonomous) mode of operation.

For example, control system 100 may be operated to capture images from one or more cameras 112 mounted at various locations of semi-truck 700 and perform processing (e.g., image processing) on those captured images to identify objects proximate to or in a path of the semi-truck 700. In some aspects, one or more lidars 114 and radar 116 sensors may be positioned on the vehicle to sense or detect the presence and volume of objects proximate to or in the path of the semi-truck 700. Other sensors may also be positioned or mounted at various locations of the semi-truck 700 to capture other information such as position data. For example, the sensors might include one or more satellite positioning sensors and/or inertial navigation systems such as GNSS/IMU 118. A Global Navigation Satellite System (GNSS) is a space-based system of satellites that provides the location information (longitude, latitude, altitude) and time information in all weather conditions, anywhere on or near the Earth to devices called GNSS receivers. GPS is the world's most used GNSS system and may be used interchangeably with GNSS herein. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU 118 sensors may be used in conjunction with features of the present invention.

The data collected by each of the sensors 110 may be processed by computer system 140 to generate control signals that might be used to control an operation of the semi-truck 700. For example, images and location information may be processed to identify or detect objects around or in the path of the semi-truck 700 and control signals may be transmitted to adjust engine 184, steering 186, and/or brakes 188 via controller(s) 182, as needed to safely operate the semi-truck 700 in an autonomous or semi-autonomous manner. Note that while illustrative example sensors, actuators, and other vehicle systems and devices are shown in FIG. 1, those skilled in the art, upon reading the present disclosure, will appreciate that other sensors, actuators, and systems may also be included in system 100 consistent with the present disclosure. For example, in some embodiments, actuators that provide a mechanism to allow control of a transmission of a vehicle (e.g., semi-truck 700) may also be provided.

Control system 100 may include a computer system 140 (e.g., a computer server) that is configured to provide a computing environment in which one or more software, firmware, and control applications (e.g., items 160-182) may be executed to perform at least some of the processing described herein. In some embodiments, computer system 140 includes components that are deployed on a vehicle (e.g., deployed in a systems rack 740 positioned within a sleeper compartment 712 of the semi-truck as shown in FIG. 7C). Computer system 140 may be in communication with other computer systems (not shown) that might be local to and/or remote from the semi-truck 700 (e.g., computer system 140 might communicate with one or more remote terrestrial or cloud-based computer systems via a wireless communication network connection).

According to various embodiments described herein, computer system 140 may be implemented as a server. In some embodiments, computer system 140 may be configured using any number of computing systems, environments, and/or configurations such as, but not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

Different software applications or components might be executed by computer system 140 and control system 100. For example, as shown at active learning component 160, applications may be provided that perform active learning machine processing to process images captured by one or more cameras 112 and information obtained by lidars 114. For example, image data may be processed using deep learning segmentation models 162 to identify objects of interest in the captured images (e.g., other vehicles, construction signs, etc.). In some aspects herein, deep learning segmentation may be used to identify lane points within the lidar scan. As an example, the system may use an intensity-based voxel filter to identify lane points within the lidar scan. Lidar data may be processed by machine learning applications 164 to draw or identify bounding boxes on image data to identify objects of interest located by the lidar sensors.

Information output from the machine learning applications may be provided as inputs to object fusion 168 and vision map fusion 170 software components that may perform processing to predict the actions of other road users and to fuse local vehicle poses with global map geometry in real-time, enabling on-the-fly map corrections. The outputs from the machine learning applications may be supplemented with information from radars 116 and map localization 166 application data (as well as with positioning data). In some aspects, these applications allow control system 100 to be less map reliant and more capable of handling a constantly changing road environment. Further, by correcting any map errors on-the-fly, control system 100 may facilitate safer, more scalable and more efficient operations as compared to alternative map-centric approaches.

Information is provided to prediction and planning application 172 that provides input to trajectory planning 174 components allowing a trajectory to be generated by trajectory generation system 176 in real time based on interactions and predicted interactions between the semi-truck 700 and other relevant vehicles in the trucks operating environment. In some embodiments, for example, control system 100 generates a sixty second planning horizon, analyzing relevant actors and available trajectories. The plan that best fits multiple criteria (including safety, comfort and route preferences) may be selected and any relevant control inputs needed to implement the plan are provided to controller(s) 182 to control the movement of the semi-truck 700.

In some embodiments, these disclosed applications or components (as well as other components or flows described herein) may be implemented in hardware, in a computer program executed by a processor, in firmware, or in a combination of the above, unless otherwise specified. In some instances, a computer program may be embodied on a computer readable medium, such as a storage medium or storage device. For example, a computer program, code, or instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of non-transitory storage medium known in the art.

A non-transitory storage medium may be coupled to a processor such that the processor may read information from, and write information to, the storage medium. In an alternative, the storage medium may be integral to the processor. The processor and the storage medium may reside in an application specific integrated circuit ("ASIC"). In an alternative embodiment, the processor and the storage medium may reside as discrete components. For example, FIG. 1 illustrates an example computer system 140 that may represent or be integrated in any of the components disclosed hereinbelow, etc. As such, FIG. 1 is not intended to suggest any limitation as to the scope of use or functionality of embodiments of a system and method disclosed herein. Computer system 140 is capable of being implemented and/or performing any of the functionality disclosed herein.

Computer system 140 may be described in the general context of computer system-executable instructions, such as program modules, being executed by a computer system. Generally, program modules may include routines, programs, objects, components, logic, data structures, and so on that perform particular tasks or implement particular abstract data types. Computer system 140 may be implemented in distributed cloud computing environments where tasks are performed by remote processing devices that are linked through a communications network. In a distributed cloud computing environment, program modules may be located in both local and remote computer system storage media including non-transitory memory storage devices.

Referring to FIG. 1, computer system 140 is shown in the form of a general-purpose computing device. The components of the computer system 140 may include, but are not limited to, one or more processors (e.g., CPUs 142 and GPUs 144), a communication interface 146, one or more input/output interfaces 148, and one or more storage devices 150. Although not shown, computer system 140 may also include a system bus that couples various system components, including system memory, to CPUs 142. In some embodiments, input/output (I/O) interfaces 148 may also include a network interface. For example, in some embodiments, some or all of the components of the control system 100 may be in communication via a controller area network ("CAN") bus or the like interconnecting the various components inside of the vehicle in which control system 100 is deployed and associated with.

In some embodiments, storage device 150 may include a variety of types and forms of non-transitory computer readable media. Such media may be any available media that is accessible by computer system/server, and it may include both volatile and non-volatile media, removable and non-removable media. System memory, in one embodiment, implements the processes represented by the flow diagram(s) of the other figures herein. The system memory can include computer system readable media in the form of volatile memory, such as random access memory (RAM) and/or cache memory. As another example, storage device 150 can read and write to a non-removable, non-volatile media (not shown and typically called a "hard drive" or a "solid-state drive"). Although not shown, the storage device 150 may include one or more removable non-volatile disk drives such as magnetic, tape or optical disk drives. In such instances, each can be connected to the bus by one or more data media interfaces. Storage device 150 may include at least one program product having a set (e.g., at least one) of program modules, code, and/or instructions that are configured to carry out the functions of various embodiments of the application.

As discussed above, the wiring and connections that allow the sensors and other devices of FIG. 1 to exchange data with the computer system 140 including a variety of different wiring types and communication protocols. For example, some of the vehicle systems (such as the throttle 184, steering 186 and brakes 188) may communicate using a CAN bus, while other devices, such as sensors 112-118) may communicate over other protocols or communication methods (such as RS232/485, different Ethernet connector types, etc.). The result can be a complicated and difficult to manage assortment of cables, wires and connections. Further, some of the connection types may include types that are not resistant to vibration or the difficult conditions experienced by a traveling vehicle (particularly those encountered by a semi-truck). The result is that the wiring and connections are difficult to connect and maintain and make it difficult to implement any computer system redundancy. To further complicate matters, different vehicles may have different configurations of sensors or vehicle systems.

Figure 2:
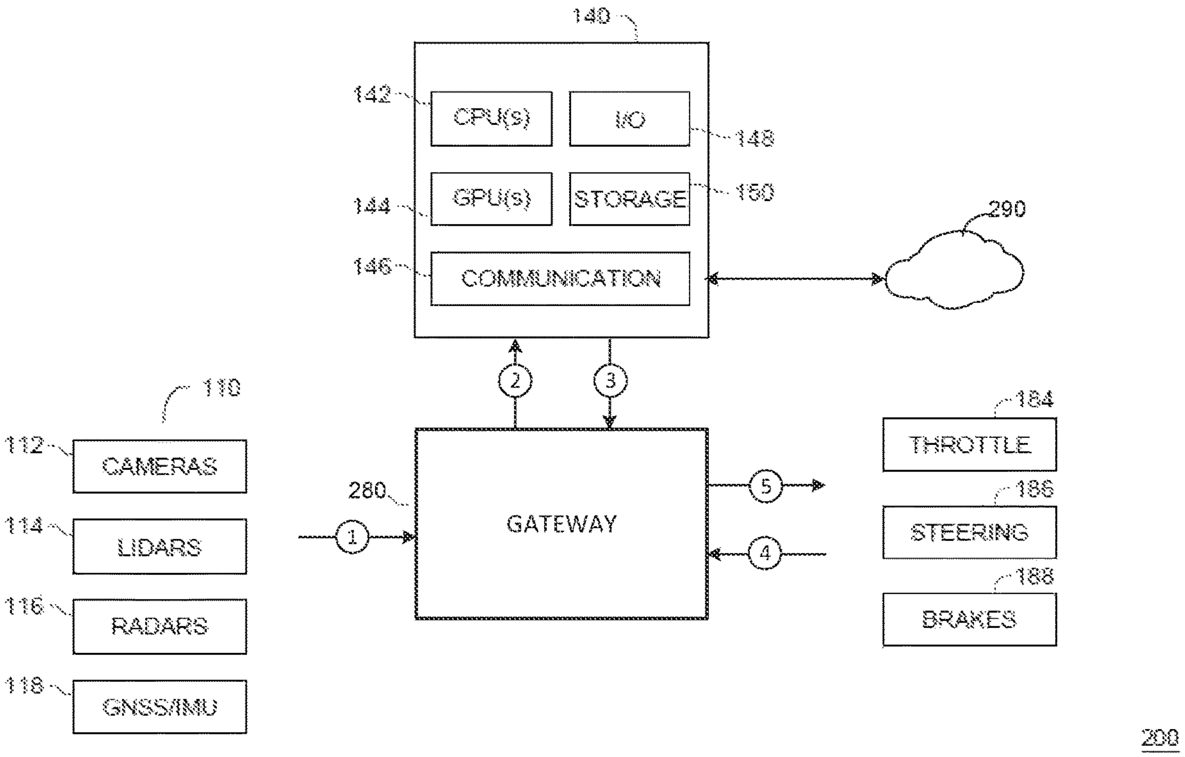
FIG. 2 is an illustrative block diagram of a control system pursuant to some embodiments.

Reference is now made to FIG. 2 where a control system 200 is shown which remedies these and other problems. As shown, control system 200 includes a computer system 140 similar to the computer system 140 of FIG. 1. In the embodiment depicted in FIG. 2, a safety gateway 280 is provided which serves as a communication gateway between the various sensors (including GPS, lidar, radar, IMU, cameras, etc.) and the computer system 140 as well as between other devices (such as truck systems like the throttle, brakes, steering, etc.). The safety gateway 280 may communicate with the computer system 140 using a single connection—for example, a Ethernet uplink connection. This single connection with the computer system 140 provides a number of advantages as will be described further herein. While a single connection is used in some embodiments, one or more additional connections between the safety gateway 280 and the computer system 140 may also be used (e.g., for redundancy or the like).

In the embodiment shown in FIG. 2, the safety gateway 280 is configured to receive data from one or more sensors 110 and to send and receive data to and from vehicle systems 184-188. For example, the safety gateway 280 receives input data from sensors 110 (at message path (1)), provides that data to computer system 140 (at message path (2)), receives commands from computer system 140 (at message path (3)), receives vehicle state updates from vehicle systems 184-188 (at message path (4)), and transmits vehicle system commands (at message path (5)). In some embodiments, a further message path may be provided to issue sensor commands to the sensors 110 (not shown in FIG. 2). The gateway 280 is configured with a number of connector ports (not shown in FIG. 2) to connect with the various sensors 110 and vehicle systems 184-188. Different configurations of the ports of the gateway 280 are described further below in conjunction with the description of FIGS. 5 and 6.

Pursuant to some embodiments, the safety gateway 280 is implemented using a network processor as well as one or more network connectors. Pursuant to some embodiments, the safety gateway 280 is configured with a 2.5G Ethernet connection (for connection to the computer system 140), ports to connect to a vehicle CAN bus (for communication with the vehicle systems 184-188), RS232 connectors, one or more GPS connectors (using universal asynchronous receiver/transmitter ("UART") serial communications), and other Ethernet ports (e.g., for receiving lidar sensor data, camera data, and other sensor data).

Because different vehicles may be configured with different sensors and vehicle systems, the operation of the safety gateway 280 is configured with a configuration file that defines, for a specific vehicle and a specific computer system 140 (and, for example, a specific configuration of software operated by the computer system 140), parameters such as a human readable purpose of each communication channel (e.g., "left middle range lidar", "brake unit CAN bus", etc.), transport parameters (e.g., such as UDP port, priority, etc.), the data format of each channel (e.g., "CAN frame", "IMU packet", etc.) and physical interface details for each channel (e.g., linux device, baud rate, etc.) to be used on the gateway side.

Figure 3:
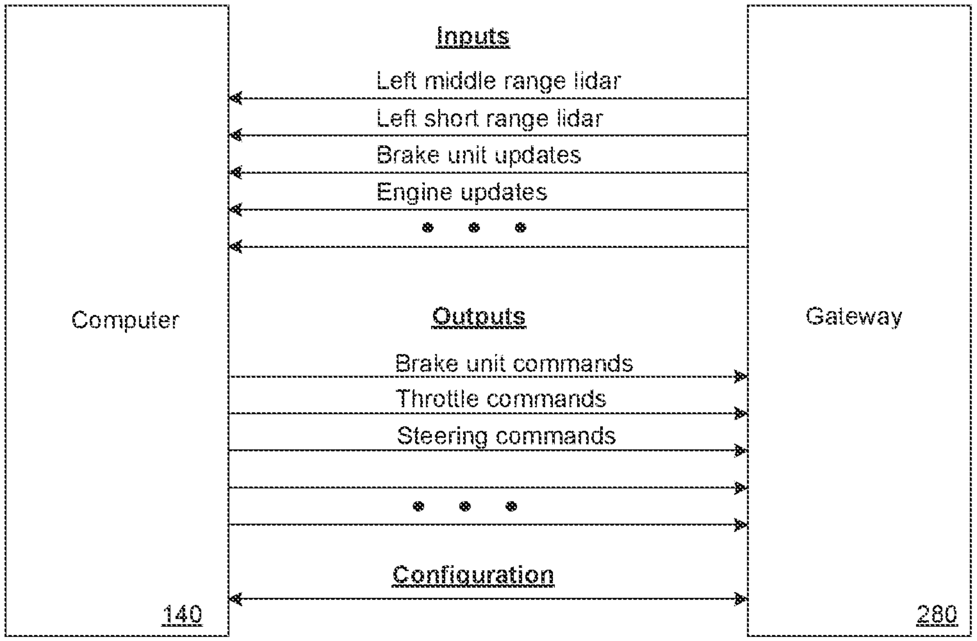
FIG. 3 is an illustrative depiction of communication between a gateway and a computing system pursuant to some embodiments.

Pursuant to some embodiments, the safety gateway 280 abstracts the various inputs and outputs from the configuration of a specific vehicle, allowing the use of a standard configuration of the safety gateway 280 with different vehicles having different sensor and system configurations. The configuration file of each safety gateway 280 defines master and slave computer IP addresses and ports and an arbitrary number of logical channels between the safety gateway 280 and a computer system 140. Each of the logical channels are unidirectional (e.g., each of the channels (1)-(5) depicted in FIG. 2 are unidirectional). An illustrative example of the logical channels that may be implemented using features of the present invention are shown in FIG. 3 where a plurality of channels are shown between a safety gateway 280 and a computer system 140. The channels may include input channels (inputs to the computer system 140) to transport data associated with sensors and vehicle systems (e.g., such as "left middle range lidar", "left short range lidar", "brake unit updates", "engine updates", etc.). The channels may also include output channels (outputs from the computer system 140 for routing by the safety gateway 280) to transport commands or other data to be delivered by the safety gateway 280 to a relevant vehicle system or device (e.g., such as "brake unit commands", "throttle commands", "steering commands", or the like). The channels may also include one or more channels associated with a configuration of the safety gateway 280 for use with a specific vehicle.

Embodiments allow a standard hardware configuration of a safety gateway 280 to be used in different vehicle environments. Pursuant to some embodiments, this is achieved in part through the use of one or more configuration files that are provisioned when a safety gateway 280 is used in a vehicle. Pursuant to some embodiments, each configuration file is provisioned using a process such as the provisioning process 400 shown in FIG. 4. This provisioning process 400 may be performed each time a vehicle is operated, ensuring that the safety gateway 280 is properly configured even if changes have been made to the configuration or software of the computer system 140 or the configuration or software of the safety gateway 280. For example, embodiments ensure that a safety gateway 280 is properly configured for operation with a specific vehicle even in situations where different software build processes and teams work on the software of the safety gateway 280 than those that work on the software of the computer system 140. Embodiments allow formal validation of a configuration of a safety gateway 280 in a simplified and more repeatable fashion as each channel may be associated with a specific data type, thereby allowing the generation of automatic test data.

Figure 4:
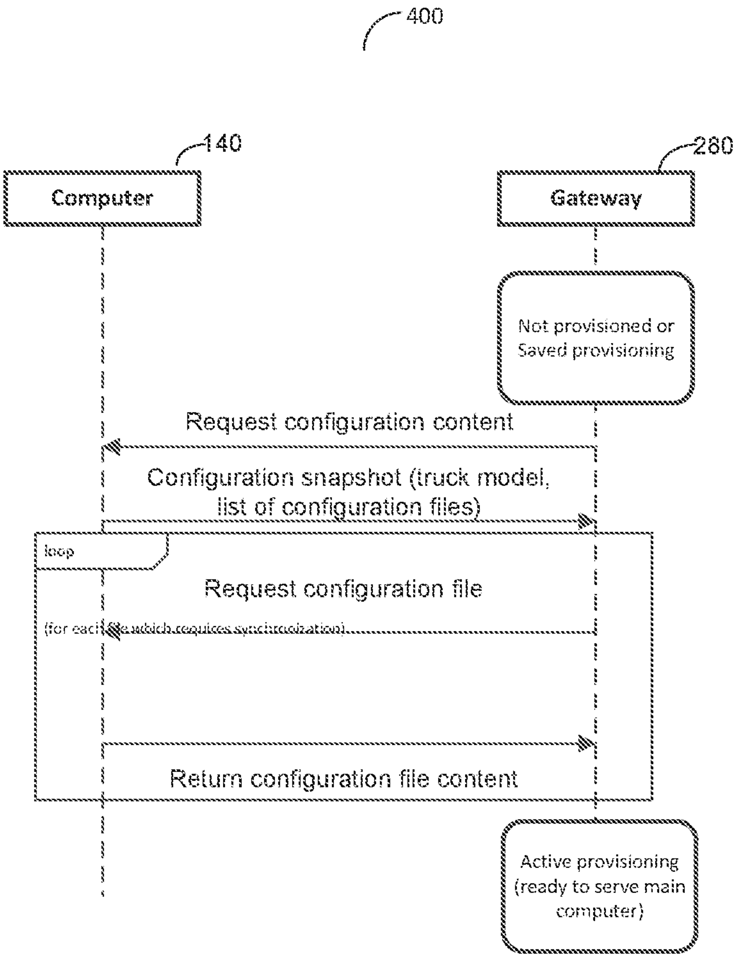
FIG. 4 is an illustrative depiction of a configuration personalization flow between a gateway and a computing system pursuant to some embodiments.

As shown in FIG. 4, the provisioning process 400 includes operating the safety gateway 280 to determine whether the safety gateway 280 has not been provisioned (e.g., the safety gateway 280 is newly-installed or the like) or if a configuration file exists (a "saved" provisioning, such as where the gateway has previously been provisioned for a vehicle). Because it is important that both the computer 140 and the safety gateway 280 have an identical configuration, the provisioning process 400 is performed even in situations where the safety gateway 280 has previously been provisioned (e.g., to avoid situations where the computer 140 or other aspects of the vehicle have changed since the last time the configuration file was provisioned). The provisioning may not be needed if, for example, the vehicle has simply paused during a trip.

If the determination is that the safety gateway 280 has not been provisioned or that the configuration has been saved, the process continues with operating the safety gateway 280 to request configuration content from the computer system 140. The computer system 140 is configured to respond to such a request for configuration content by returning a configuration snapshot, including information such as the vehicle model and a list of configuration files (and, in some embodiments, versioning information identifying the current version of each file). In some embodiments, the safety gateway 280 may iteratively request each configuration file in the list. In other embodiments, the configuration files may be provided in a batch. In the embodiment depicted in FIG. 4, the safety gateway 280 responds to the list provided by the computer system 140 by iteratively looping through the list of configuration files and requesting each configuration file. In some embodiments, not all configuration files may require synchronization—for example, in some embodiments, the safety gateway 280 may already have the correct version of a configuration file, in which case that file need not be requested.

In some embodiments, a configuration file may be provided by a remote server. For example, the computer system 140 may request one or more configuration files from a server via aa network connection 190. The configuration file content may then be stored on the computer system 140 and provided to the safety gateway 280 so that both the computer system 140 and the safety gateway 280 share the identical configuration details.

In some embodiments, the configuration files include a list of channels and their configuration and are stored in a human-readable text file. For example, in some embodiments, the files are implemented using Protocol Buffers (also referred to as "protobuf", which is an open-source cross-platform data format used to serialize structured data and developed by Google™). Other formats may be used as well (e.g., ROS messages, flat buffers, XML, etc.). In embodiments that use protobuf, the proto definition files (e.g., ".proto") may describe data structures, messages and services to implement the configuration of each sensor associated with the vehicle. In some instances, other data formats may be used to formally define data of a configuration file herein. In some embodiments, each channel can be viewed as an input for one node or device and as an output for another side of the communication (e.g., such as shown in FIG. 3). In some embodiments, the configuration file lists input and output channels from the master point of view (the device which receives the input). For example, as shown in FIG. 3, the safety gateway 280 acts as a slave when sending inputs to the computer system 140 and listens for changes in the output channels. A configuration file may include information identifying the IP address of the master (e.g., such as the computer system 140) as well as information identifying the IP address of the slave (e.g., such as the safety gateway 280). In some embodiments, the configuration file may further specify an address of a remote server that functions as a configuration server that maintains current configuration files for different vehicles.

In some embodiments, a configuration file may include a concept of the data format of a particular channel. For example, a data channel format may include information identifying a type of the channel (e.g., such as an "input" or an "output" where an input is information sent from the slave to the master, and an output is information sent by the master to the slave). For example, an input may be a channel including information received by the safety gateway 280 from a sensor such as a camera which is then transmitted with the configuration information to the computer system 140. As another example, an output may be a channel including information for controlling the operation of a vehicle system transmitted from the computer system 140 to the safety gateway 280 for use in controlling a vehicle system.

The configuration file may include human-readable information identifying each input and each output. For example, an input containing information from a camera may include a human-readable label identifying the specific camera on the vehicle (e.g., such as "front right camera"). Each input and output may further include information identifying a data port that the channel is sent on as well as a format of the channel information. A number of different types of formats may be used. Different types of formats may require different types of handling (e.g., some types of formats may require a check for dropped packets, a check for long payload fragmentation, etc.). In an illustrative, but not limiting, example, formats may include: (i) RAW_DATA (a format where the data is transmitted in raw format, such as, for example, when camera data is transmitted), (ii) ANY_PAYLOAD (a format where an arbitrary payload is wrapped into a packet with a common header which includes the sent time, fragmentation information, and an auto-increment counter to check for lost packets) or (iii) FRAGMENTED_DATA (a format for sending large payloads where use of the ANY_PAYLOAD format would result in extra serialization/deserialization calls on each fragment).

In some embodiments, each input or output further includes information identifying a maximum transmission unit (or "MTU") specifying a maximum size of a packet that can be sent. In some embodiments, a payload format may also be specified (in addition to the channel format information). For example, a channel in which data is sent using the ANY_PAYLOAD format may include information specifying that the payload format is (i) CAN_MESSAGE (a format for transmitting CAN message data), (ii) CAN_BATCH (a format for transmitting batches of CAN messages), (iii) POWER_STATE (a format for transmitting power state data associated with different vehicle sensors or devices), (iv) IMU_PACKET (a format for transmitting IMU update data), (v) HEALTH_REPORT (detailed information about the safety gateway health status). Other specializations could be easily added if needed. The use of a payload format in addition to the channel format allows the receiver to properly handle the received data. This substantially reduces the number and types of cabling and connections required to operate the computer system 140.

The channel information may further include the data samples which may be, for example, a link to a file that can be used to simulate a realistic data stream for testing purposes. The message body may also include information identifying other details of the message (such as, for example, information identifying a time interval at which the body is updated, or information further identifying the format of the message body).

In this manner, embodiments allow the computer system 140 and safety gateway 280 to dynamically define (based on the configuration file) how each should communicate with the other. For example, based on the content of the configuration file, the computer system 140 and the safety gateway 280 know which channels are available, where to find updated data, the update interval that updates should be made available, and the format and content of data for each channel. Further, because the configuration file defines the format in which messages are sent, embodiments allow the computer system 140 to communicate with the safety gateway 280 using a unified communication channels (e.g., via an Ethernet connection or the like), even though different sensor or vehicle systems communicate with the safety gateway 280 using other communication protocols (e.g., such as serial interfaces and CAN). The computer system 140 may transmit a command to modify operation of a vehicle system (e.g., such as a steering control, or a braking system) to the safety gateway 280 using the Ethernet connection, and the safety gateway 280 can convert the command to a CAN bus protocol (or the like) for transmission to the vehicle system. Similar conversions can occur with sensor data and vehicle data received by the safety gateway 280.

Figure 5A:
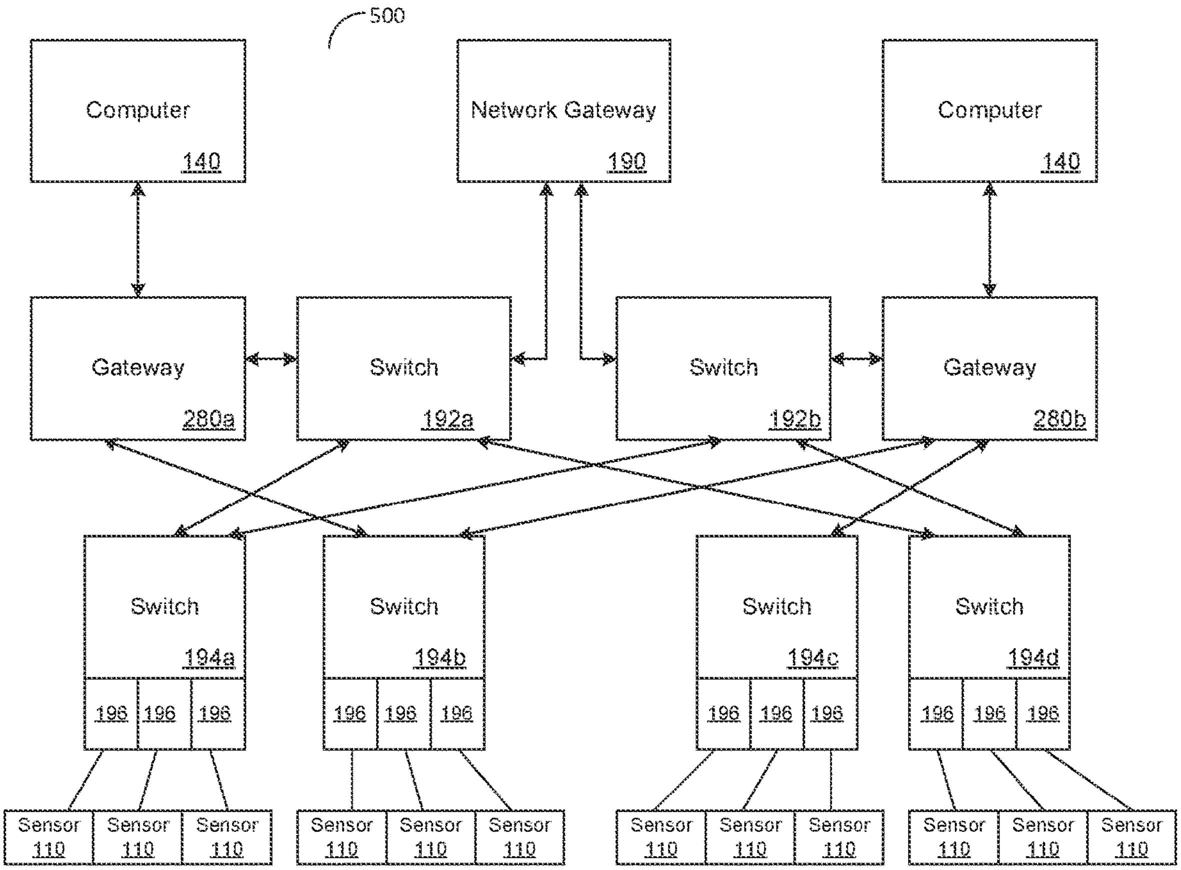
FIGS. 5A-5B are illustrative block diagrams of a redundant control system pursuant to some embodiments.

Embodiments allow the use of a redundant configuration such as that shown in FIG. 5. The system 500 of FIG. 5A provides two dual redundant data paths that feed data to the computer system 140. Each data path includes a safety gateway 280*a* or 280*b* and corresponding switch 192*a* and 192*b*. Data received from each sensor 110 is duplicated using a set of switches 194*a-d* and connectors 196. For example, one switch 194*a* may transmit sensor data to each of the two switches 192*a, b*. A second switch 194*d* may transmit sensor data to each of the two safety gateways 280*a, b*. By providing redundant safety gateways 280, embodiments substantially reduce or eliminate the types of failures that could prevent an autonomous vehicle (such as the semi-truck 700 of FIG. 7) from having information needed to operate the vehicle. The two safety gateways 280 are each configured using the same configuration file and produce the same information needed by the computer system 140 to monitor and control operation of the vehicle.

Further, in some embodiments, sensors around the vehicle may be striped or staggered across the switches 194 such that a single switch 194 does not carry similar sensor data. For example, switch 194*a* of FIG. 5A may receive sensor data from a camera positioned at the front left of the vehicle, while a different switch 194*d* may receive sensor data from a camera positioned at the front right of the vehicle. Similar configurations may also be alternated or varied across switches 194 for other types of sensor data (e.g., such as lidar, etc.). Such a configuration further reduce or eliminate the types of failures that could prevent or impair operation of an autonomous vehicle.

Figure 5B:
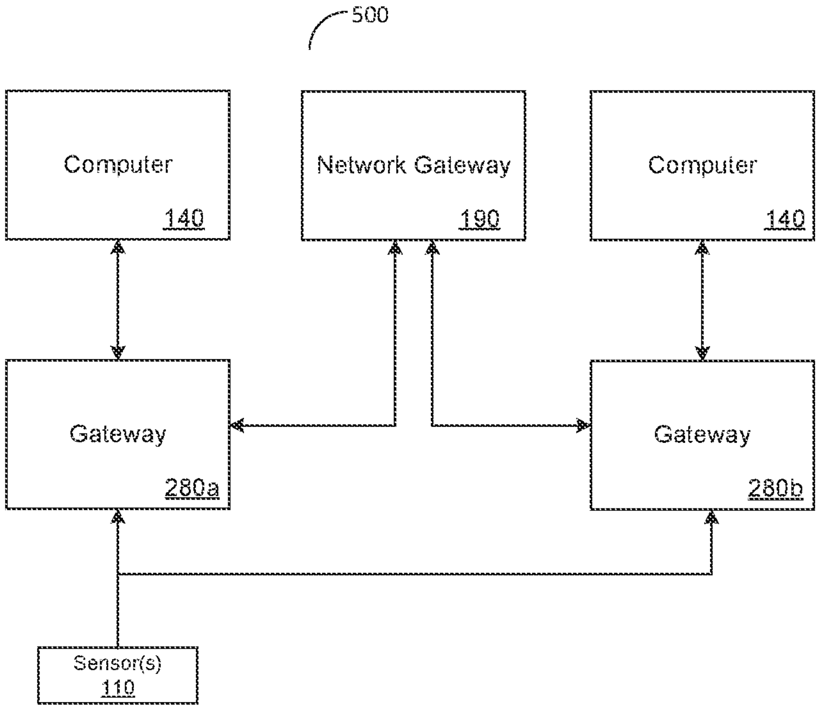

The configuration depicted in FIG. 5A shows a number of Ethernet connections 196. For non-Ethernet signals (such as CAN data), each safety gateway 280*a,b* may be configured to receive data from the relevant input sources (e.g., for CAN bus data, each safety gateway 280*a, b* may be coupled to the CAN bus ensuring that the computer system 140 has two sources of the CAN bus data). Such a configuration is shown in FIG. 5B. The configuration of FIG. 5A and FIG. 5B is used in a single system-they are shown separately for convenience and ease of illustration. In FIG. 5B, one or more sensors 110 that do not communicate via Ethernet are shown as providing data to two safety gateways 280*a, b*. Each safety gateway 280 receives the same information and thereby provide redundancy for vehicle operation. If one of the safety gateways 280 becomes unavailable, the other will continue to provide sensor data to the computer system 140 to allow the computer system 140 to continue to operate, monitor and control the vehicle. Examples of sensors that my not communicate via Ethernet include, for example: radar devices, CAN bus devices, IMU devices (which generally communicate using RS232/422) and GPS devices. While item 110 is labeled as a "sensor", the term is used more generically and may include any vehicle system or device producing data used by the computer system 140 for operation, monitoring and control.

In the systems depicted in FIGS. 5A and 5B, a single computer system 140 is shown. In some embodiments, redundant computer systems 140 may also be provided. Further, in some embodiments, each of the safety gateways 280 may be configured to operate as computer systems 140. For example, in the event that the computer system 140 is rendered inoperable or unavailable, a safety gateway 280 may take over control functions to safely drive the vehicle, potentially in a limited or minimum-risk maneuver (e.g., to safely bring the vehicle to a stop or to allow sufficient time for a human operator to resume control).

Figure 6:
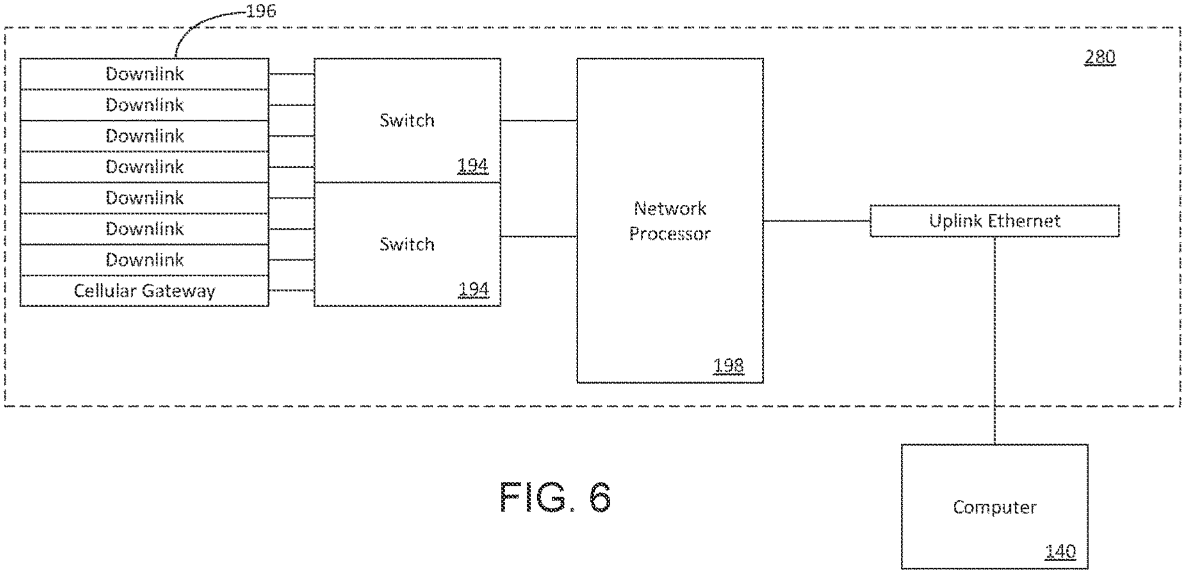
FIG. 6 is an illustrative block diagrams of the gateway's network architecture pursuant to some embodiments.

The safety gateway(s) 280 may be configured in a number of different ways. For example, referring to FIG. 6, a safety gateway 280 is depicted which uses a vehicle network processor 198 in conjunction with several switches 194 (e.g., such as Ethernet switches) to communicate via a number of network connections 196 to receive and/or transmit data to one or more vehicle sensors or systems. The safety gateway 280 is in communication with a remote computer system 140 via an uplink connection, thereby substantially eliminating the need for a plurality of cables associated with the computer system 140. Other configurations may also be provided, and the configuration depicted in FIG. 6 is for illustrative purposes only.

FIGS. 7A-7C are illustrative depictions of exterior views of a semi-truck 700 that may be associated with or used in accordance with example embodiments. Semi-truck 700 is shown for illustrative purposes only. As such, those skilled in the art, upon reading the present disclosure, will appreciate that embodiments may be used in conjunction with a number of different types of vehicles and are not limited to a vehicle of the type illustrated in FIGS. 7A—7C. The example semi-truck 700 shown in FIGS. 7A-7C is one style of truck configuration that is common in North America that includes an engine 706 forward of a cab 702, a steering axle 714, and two drive axles 716. A trailer (not shown) may typically be attached to semi-truck 700 via a fifth-wheel trailer coupling that is provided on a frame 718 and positioned over drive axles 716. A sleeper compartment 712 may be positioned behind cab 702, as shown in 7A and 7C. FIGS. 7A-7C further illustrate a number of sensors that are positioned at different locations of semi-truck 700. For example, one or more sensors may be mounted on a roof of cab 702 on a sensor rack 720. Sensors may also be mounted on side mirrors 710, as well as other locations of the semi-truck. Sensors may be mounted on a bumper 704, as well as on the side of the cab 702 and other locations. For example, a rear facing radar 736 is shown as being mounted on a side of the cab 702 in FIG. 7A. Embodiments may be used with other configurations of trucks and other vehicles (e.g., such as semi-trucks having a cab over or cab forward configuration or the like). In general, and without limiting embodiments of the present disclosure, features of the present invention may be used with desirable results in vehicles that carry cargo over long distances, such as long-haul semi-truck routes.

FIG. 7B is a front view of the semi-truck 700 and illustrates a number of sensors and sensor locations. A sensor rack may secure and position several sensors above windshield 708 including a long range lidar 722, long range cameras 724, GPS antennas 734, and mid-range front facing cameras 726. Side mirrors 710 may provide mounting locations for rear-facing cameras 728 and mid-range lidar 730. A front radar 732 may be mounted on bumper 704. Other sensors (including those shown and some not shown) may be mounted or installed on other locations of semi-truck 700. As such, the locations and mounts depicted in FIGS. 7A-7C are for illustrative purposes only.

Referring now to FIG. 7C, a partial view of semi-truck 700 is shown that depicts some aspects of an interior of cab 702 and the sleeper compartment 712. In some embodiments, portion(s) of control system 200 of FIG. 2 might be deployed in a systems rack 740 in the sleeper compartment 712, allowing easy access to components of the control system 200 for maintenance and operation.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, “apps”, or code) may include machine instructions for a programmable processor, and may be implemented in a high-level procedural and/or object-oriented programming language, and/or in assembly/machine language. As used herein, the terms “machine-readable medium” and “computer-readable medium” refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The “machine-readable medium” and “computer-readable medium,” however, do not include transitory signals. The term “machine-readable signal” refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:

a control system comprising one or more actuators to operate an autonomous vehicle;

a computer system configured to control and monitor operation of the autonomous vehicle, the computer system including a memory storing a first configuration file; and a safety gateway including (i) a memory storing a second configuration file and (ii) a processor configured to;

determine a status of the second configuration file;

request, based on the status, configuration content from the computer system;

update the second configuration file with the configuration content such that the second configuration file has substantially identical configuration content as the first configuration file, the configuration content defining one or more data structures to configure the safety gateway to receive sensor data from a plurality of sensors installed on the autonomous vehicle;

route all the sensor data from the plurality of sensors through the safety gateway to the computer system over a network interface; and route all control signals to operate the autonomous vehicle from the computer system through the safety gateway to the actuators of the control system of the autonomous vehicle, the control signals being generated by the computer system based on the sensor data, wherein the first configuration file and the second configuration file each comprise a list of channels between the safety gateway and the computer system, and each further comprise configuration information for each channel.

2. The system of claim 1, wherein the configuration content identifies, for each of the plurality of sensors, a sensor name, a data port, and a standard payload format.

3. The system of claim 2, wherein the safety gateway processes messages from each of the plurality of sensors using information from the configuration content to standardize the messages into a Standard payload format for transmission to the computer system over the network interface.

4. The system of claim 1, wherein the network interface is an Ethernet protocol network interface and wherein the sensor data received by the safety gateway includes sensor data received from at least one sensor over a serial interface.

5. The system of claim 4, wherein the sensor data received from the plurality of sensors over the serial interface is converted by the safety gateway into a message format compatible with the Ethernet protocol based on information from the configuration content.

6. The system of claim 1, wherein the status of the second configuration file is one of (i) a status that the second configuration file has not been provisioned, and (ii) a status that the second configuration file has been saved.

7. The system of claim 1, wherein the processor is further configured to determine that the autonomous vehicle is beginning a new route.

8. The system of claim 1, further comprising a second safety gateway, the second safety gateway including a memory storing a third configuration file and a processor configured to:

determine a status of the third configuration file;

request, based on the status, configuration content from the computer system; and update the third configuration file with the configuration content such that the third configuration file has substantially identical configuration content as the first configuration file and the second configuration file, the configuration content defining one or more data structures to configure the second safety gateway to receive sensor data from the plurality of sensors installed on the autonomous vehicle and to route all the sensor data in a standardized format from the plurality of sensors through the second safety gateway to the computer system over the network interface, wherein the safety gateway and the second safety gateway are arranged in a redundant configuration to provide a plurality of redundant data paths to provide all the sensor data to the computer system.

9. The system of claim 8, wherein the safety gateway and the second safety gateway receive substantially the same sensor data.

10. A method performed by a safety gateway installed in an autonomous vehicle, comprising:

determining a status of a first configuration file stored in a memory of the safety gateway;

based on the status of the first configuration file, requesting a second configuration file stored in a memory of a computer system installed in the autonomous vehicle;

updating the first configuration file to be the same as the second configuration file resulting in an updated first configuration file, the updated first configuration file defining a plurality of data structures to configure the safety gateway to receive sensor data from a plurality of sensors installed on the autonomous vehicle, the updated first configuration file further defining, for each of the plurality of sensors, a sensor name, a data port, and a payload format;

route all the sensor data from the plurality of sensors through the safety gateway to the computer system over a network interface; and route all control signals to operate the autonomous vehicle from the computer system through the safety gateway to actuators of control systems of the autonomous vehicle, the control signals being generated by the computer system based on the sensor data, wherein the updated first configuration file comprises a list of channels between the safety gateway and the computer system and further comprises configuration information for each channel.

11. The method of claim 10, further comprising:

determining a status of a third configuration file stored in a memory of a second safety gateway installed in the autonomous vehicle; and based on the status of the third configuration file, updating the third configuration file in the memory of the second safety gateway such that the third configuration file is substantially the same as the first configuration file and the second configuration file wherein the safety gateway and the second safety gateway are arranged in a redundant configuration to provide a plurality of redundant data paths to provide the sensor data to the computer system.

12. The method of claim 11, wherein the safety gateway and the second safety gateway receive substantially the same sensor data.

13. The method of claim 10, wherein the updated first configuration file identifies, for each of the plurality of sensors, a standard payload format.

14. The method of claim 13, wherein the safety gateway processes messages from each of the plurality of sensors using information from the updated first configuration file to standardize the messages into the standard payload format for transmission to the computer system over a network interface.

15. The method of claim 10, wherein the sensor data is transmitted from the safety gateway to the computer system over an Ethernet protocol network interface and wherein the sensor data received by the safety gateway includes sensor data received from at least one sensor over a serial interface.

16. The method of claim 15, wherein the sensor data received from the plurality of sensors over the serial interface is converted by the safety gateway into a message format compatible with the Ethernet protocol based on information from the updated first configuration file.

17. The method of claim 10, wherein the status of the first configuration file is one of: (i) a status that the first configuration file has not been provisioned, and (ii) a status that the first configuration file has been saved.

18. The method of claim 10, further comprising:

operating the computer system to generate a vehicle command; and transmitting the vehicle command to the safety gateway in a message, the payload format of the message defined by the updated first configuration file.

19. The method of claim 18, further comprising:

operating the safety gateway to convert the message into a second message, a format of the second message defined by the updated first configuration file; and transmitting the second message to a vehicle system to cause the vehicle system to modify its operation.

20. The method of claim 19, wherein the format of the message is one compatible with an Ethernet transmission protocol, and the format of the second message is one compatible with a CAN bus protocol.

* * * * *